Patented Mar. 20, 1951

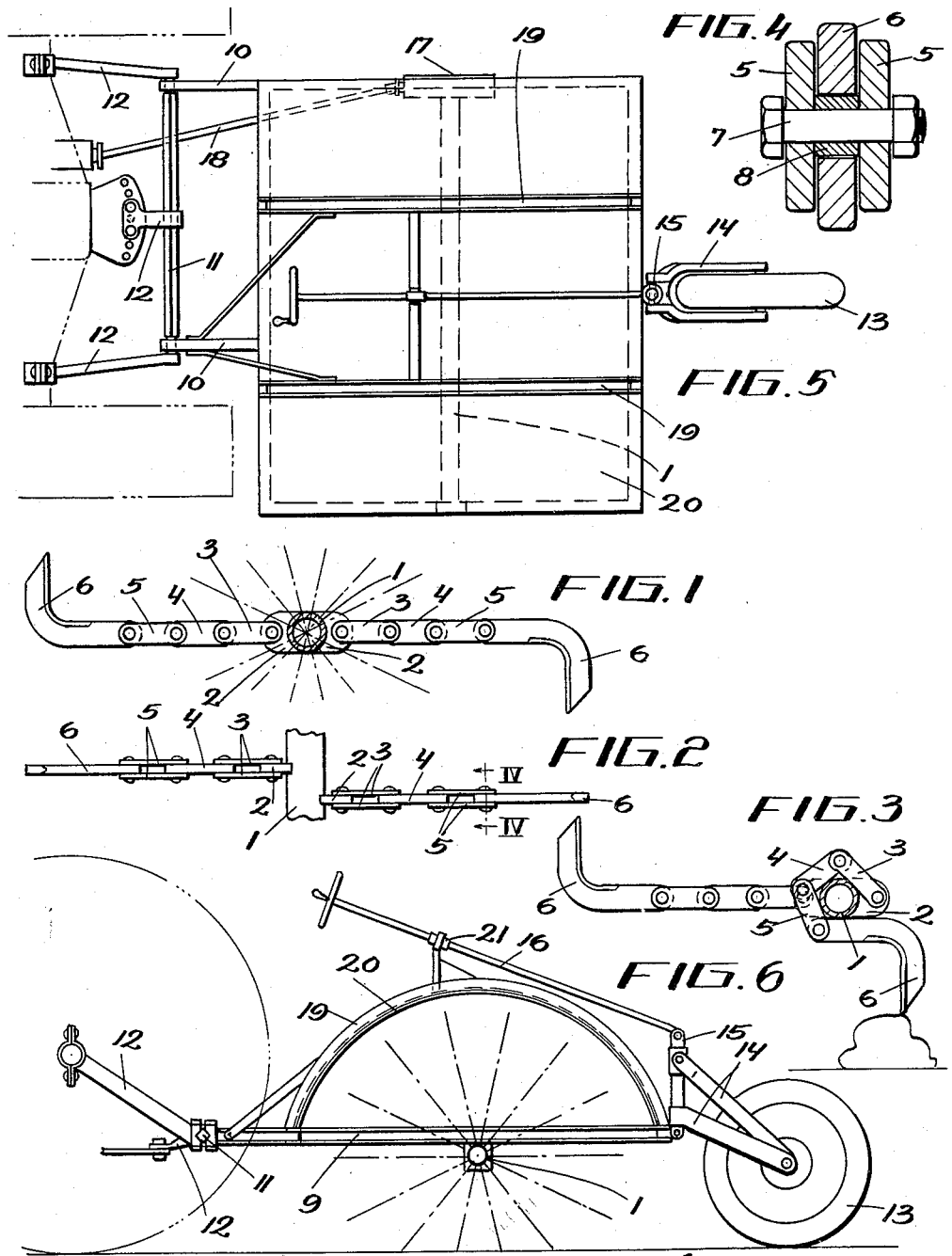

2,545,590

UNITED STATES PATENT OFFICE 2,545,590

ROTARY SOIL WORKING ELEMENT

Otto Göran August Settergren and Anders Gösta Botvid Settergren, Sennan, Sweden

Application February 20, 1948, Serial No. 9,646
In Sweden October 18, 1938

Section 1, Public Law 690, August 8, 1946
Patent expires October 18, 1958

1 Claim. (Cl. 97—216)

The present invention relates to a rotary soil working element comprising a rotary shaft to which ground treating means are attached by means of link means.

One object of the invention is to provide a rotary soil working element of the above-mentioned type which may be generally used for treating all kinds of grounds.

Another object of the invention is to provide a rotary soil working element which is especially suitable for the cultivation of wooded grazing grounds, above all mountain or brown bogs and the like, where the soil layer to be worked contains stumps and is intersected by all sorts of roots that may often be rather thick and that must be torn off and split for accelerating their mouldering and for enabling cultivation and working of the ground by means of usual agricultural implements.

A further object is to provide a rotary soil working element, the ground treating means of which, rotating around a shaft, are able not only to yield to immovable hindrances such as stone slabs and the like lying beneath the ground surface, but also to catch such roots in the ground as are not torn off or split without further ado, and to pull them up towards the shaft under simultaneous shortening of their moment arm in relation to the shaft, so that when the ground treating means possibly finally abuts with its trailing edge against its mounting lug on the shaft, the moment arm is so short that the force is sufficiently great to tear off the root by force without the stresses on any part of the rotary soil working element becoming too great.

Further features and objects of the invention will appear from the following description of an embodiment of the invention, reference being had to the accompanying drawing in which:

Fig. 1 is a vertical section through the rotary soil working element shaft with tools.

Fig. 2 shows a portion of the shaft with a couple of tools, seen from above.

Fig. 3 is a section similar to that in Fig. 1, one tool being, however, shown in engagement with a hindrance.

Fig. 4 is a section on line IV—IV of Fig. 2.

Fig. 5 is a plan view of a rotary soil working element provided with the tools according to Figs. 1 to 4 and pulled by a tractor.

Fig. 6 is a side view of the rotary soil working element.

Referring to the drawings, 1 designates a horizontal shaft which is arranged in a rotary soil working element and is driven by a motor (not shown) and which is provided with short lugs 2 fixedly mounted on the shaft and radially extending therefrom, on each of which lugs there are pivotally mounted a pair of links 3. Said links are pivotally connected to a link 4 which is in turn pivotally connected to a pair of links 5 pivotally connected to a ground treating means in the drawing shown in the form of a sickle-shaped tool 6 with a working surface in the form of a knife edge. The links 3 to 5 guide each other and the tool 6 and are so guided in relation to the lug 2 that the tool is rotatable in relation to shaft 1 and its lug 2 in a plane at right angles to the longitudinal direction of the shaft. The lugs 2 are mounted in pairs on opposite sides of the shaft 1 as appears from Fig. 2, each such pair being so displaced around the shaft in relation to the adjacent pair that the lugs, the links and tools project in a star-like manner from the shaft 1 as is indicated by means of dashed and dotted lines in Fig. 1.

As appears from Fig. 4, the links 5 are connected with the tool 6 by means of a pivot pin in the form of a bolt 7 which between the links 5 carries a sleeve 8 serving on the one hand the purpose of holding the links 5 spaced apart and on the other hand as a wearing ring for the tool 6. Also the other connections of the links and shaft lugs are made in the same manner.

In the rotary soil working element illustrated in Figs. 5 and 6 the mounting shaft 1 for the tools according to Figs. 1 to 4 is mounted in a solid frame 9 which is pivotally connected at the front by means of a pair of pull rods 10 to a transverse member 11 rigidly connected by means of stays 12 to the back portion of a tractor that is indicated only in part. The frame 9 is supported at the back by a wheel 13 provided with a rubber tire and of which the wheel fork 14 is pivoted about a vertical upright 15 which is pivotally connected at its lower end to the frame 9 and which is adjustable at its upper end by means of a telescopic rod 16 in a vertical plane, so that the position of height of the wheel 13 may be altered in relation to the frame. At its one end the tool mounting shaft 1 is connected to a gear box 17 shown in Fig. 1 and is driven by means of a shaft 18 driven from the gear box of the tractor. Above the opening of the frame in which the tools work, there is mounted a semicylindrical protection plate 20 inserted in stays 19. Said stays 19 also carry a guide 21 for the rod 16.

In use, the shaft of the soil working element, which is provided with the working tools and is mounted in a suitable frame, is driven by a motor, which shaft in an embodiment such as that shown in the drawing, in which the working surface of the tools is situated about half a meter from the shaft 1, preferably rotates at a rate of approximately 300 R. P. M. The shaft 1 thereby throws the tools 6 around and when they contact the ground the tools have a considerable force for treating it. When the tools encounter a harder hindrance their links 3 to 5 are wound more or less onto the shaft, whereby the tools will be at a less distance from the shaft 1 and are able to act upon the encountered hindrance with more force. At the greatest possible winding of the links and tools onto the shaft 1 the tool abuts with its trailing edge against the lug, as is clearly evident from Fig. 3, and gets great force for removing the encountered hindrance. When the tools are mounted in a star-like manner around the shaft, as mentioned above, their engagement with the ground follows continuously one upon the other, which is of great importance for preventing rise of too heavy pulls in the tool mounting shaft 1 and its mounting frame. Practical experiments with the described soil working element have also proved that it has an unusual high capacity as the tools effect a very good treatment of the ground and do not give rise to interruptions of the function of the machine.

The invention must not be considered as limited to the embodiment described above and shown in the drawings only, since embodiment may be modified within the scope of the invention. The tool may be of any suitable form. The interconnected links 3 to 5 may be of any suitable number. A chain which in construction and function substantially corresponds to the described construction of the links 3 to 5 may be substituted for the latter. It is obvious that the rotary soil working element may also be driven in another way than by means of a tractor, and that a special motor may be arranged for driving the tool mounting shaft 1.

What we claim and desire to secure by Letters Patent is:

A rotary soil working element comprising a rotary shaft, a plurality of lugs fixed to said shaft at spaced points along the length thereof, a plurality of ground treating means and a plurality of link means each connecting one of said ground treating means with one of said lugs and each consisting of a number of links, a plurality of pivot pin means interconnecting said links of each of said link means and connecting each of said link means with the corresponding one of said lugs and the associated one of said ground treating means, the axis of said pivot pin means being parallel to said shaft and the links of each of said link means being of such length in relation to the diameter of said shaft that said link means, when wound onto said shaft, reaches substantially three quarters of a turn around said shaft so that the trailing edge of the associated one of said ground treating means abuts against the corresponding one of said lugs thereby increasing the force applied by said ground treating means without introducing excessive stresses in the element.

OTTO GÖRAN AUGUST SETTERGREN.
ANDERS GÖSTA BOTVID SETTERGREN.

REFERENCES CITED

The following references are of record in the file of this patent:

FOREIGN PATENTS

| Number | Country | Date |
|--------|---------|------|
| 368,762 | Germany | Feb. 9, 1923 |